(12) United States Patent
Ozu

(10) Patent No.: US 8,347,507 B2
(45) Date of Patent: Jan. 8, 2013

(54) METHOD FOR ASSEMBLING ROLLER BEARING

(75) Inventor: Takuya Ozu, Kuwana (JP)

(73) Assignee: NTN Corporation, Osaka (JP)

( * ) Notice: Subject to any disclaimer, the term of this patent is extended or adjusted under 35 U.S.C. 154(b) by 840 days.

(21) Appl. No.: 12/084,902

(22) PCT Filed: Oct. 20, 2006

(86) PCT No.: PCT/JP2006/320899
§ 371 (c)(1),
(2), (4) Date: May 13, 2008

(87) PCT Pub. No.: WO2007/069391
PCT Pub. Date: Jun. 21, 2007

(65) Prior Publication Data
US 2009/0158592 A1      Jun. 25, 2009

(30) Foreign Application Priority Data
Dec. 16, 2005   (JP) .................................. 2005-363803

(51) Int. Cl.
*B21D 53/10*  (2006.01)
(52) U.S. Cl. .................................................... 29/898.06
(58) Field of Classification Search ............... 29/898.06, 29/898.08; 384/50–59; 74/570, 570.3; 16/275
See application file for complete search history.

(56) References Cited

U.S. PATENT DOCUMENTS
5,597,243 A     1/1997   Kaiser et al.

FOREIGN PATENT DOCUMENTS
| GB | 740730 | 11/1955 |
| JP | 06-058334 | 3/1994 |
| JP | 3549530 | 4/2004 |

OTHER PUBLICATIONS

International Search Report mailed Jan. 16, 2007 for International Application No. PCT/JP2006/320899.

*Primary Examiner* — David Bryant
*Assistant Examiner* — Moshe Wilensky
(74) *Attorney, Agent, or Firm* — Wenderoth, Lind & Ponack, L.L.P.

(57) ABSTRACT

A method for assembling a roller bearing having rollers and spacers interposed between the adjacent rollers includes alternately disposing, along the inner circumference of an outer ring, the rollers and the spacers. Two spacers are then placed along inner portions of rolling contact surfaces of the rollers having been disposed. The last roller is then inserted toward the outer ring so that the spacers placed on both sides are allowed to slide, whereby the last roller is mounted on the inner circumference of the outer ring.

7 Claims, 6 Drawing Sheets

US 8,347,507 B2

METHOD FOR ASSEMBLING ROLLER BEARING

FIELD OF THE INVENTION

The present invention relates to a roller bearing, and in particular, to a method for manufacturing a roller bearing having spacers, in place of a cage, interposed between rollers.

DESCRIPTION OF RELATED ART

Patent Document 1 exemplifies a roller bearing having spacers interposed between respective adjacent rollers. As shown in FIG. 6, this roller bearing is assembled by: alternately disposing the rollers 6 and the spacers 8 along the inner circumference of an outer ring 4; and pressing the last one of the spacers 8 into the gap between the rollers 6 from the inner side to the outer side. In the course of press-fitting, the last spacer 8 is compressed and deformed in the circumferential direction of the bearing so as to pass through the narrowest gap between the rollers 6.
PATENT DOCUMENT 1: Japanese Patent No. 3549530

DISCLOSURE OF THE INVENTION

Problems to be Solved by the Invention

In such a case, since the relation with a press-fitting margin must be taken into account, a spacer 8 having a wall thickness much greater than the minimum gap between the rollers 6 cannot be used. Therefore, each of the spacers 8 used has a small guiding surface (the surface coming into guiding contact with a bearing ring) that causes high contact pressure. This is likely to result in heat generation in the bearing and abnormal wear of the spacers 8.

Moreover, a tool or facility such as a press-fitting apparatus must be used to press-fit the spacer 8 into the gap between the rollers 6, and the spacer 8 may be cracked during press-fitting.

In addition, Patent Document 1 discloses a technique in which an axial slit 9 is provided in an elastic deformation portion of the spacer 8 in order to facilitate press-fitting of the last spacer 8. However, when the spacers 8 are formed of resin and are produced by injection molding, the slit 9 can have an undercut shape. Therefore, a mold having a complicated shape must be used, and the opening-closing control of the mold is also complicated. This results in an increase in manufacturing cost.

It is a principal object of the present invention to allow a roller bearing having spacers interposed between rollers to be assembled without elastic deformation of the spacers or with a minimum amount of the elastic deformation.
Means for Solving the Problems A method for assembling a roller bearing according to the present invention is applied to the assembling of a roller bearing having a plurality of rollers rotatably interposed between a raceway surface of an inner ring and a raceway surface of an outer ring, and spacers disposed between respective adjacent rollers. The method is characterized in that the last one of the rollers is mounted by sliding the spacers on rolling contact surfaces of the rollers. With the method configured as above, the roller bearing can be assembled without the spacers being elastically deformed.

Specifically, the rollers and the spacers are alternately disposed along the inner circumference of the outer ring. At this time, the spacers to be placed on both sides of the roller to be mounted last are placed along inner portions of the rolling contact surfaces of respective adjacent rollers having been disposed, while the last roller is inserted therebetween toward the outer ring so that the spacers placed on both sides are allowed to slide, whereby the last roller can be mounted on the inner circumference of the outer ring.

In this case, the shape and wall thickness of the spacer can be freely set within the range of the gap between adjacent rollers. Therefore, a guiding surface of the spacer can have a sufficiently large area, and the spacers are less likely to be cracked during assembly. Moreover, when each of the spacers is guided only by the rolling contact surfaces of the adjacent rollers, the spacers can be formed to have a concave surface that substantially conforms to the rolling contact surfaces of the rollers, whereby the behavior of the spacers during operation can be stabilized.

In addition, the above-mentioned slit for elastically deforming the spacer is not required to be provided. Therefore, when the spacers are produced by injection molding of resin, the cost for the mold and molding process can be reduced.

Note that, when the keystone effect is exerted by the rollers and the spacers, the spacers are required to be elastically deformed to some extent. However, even in such a case, the spacers are required to be elastically deformed (compressed) to some extent only during the process of sliding the spacers on the rolling contact surfaces of the rollers. Therefore, the amount of elastic deformation of the spacers can be much smaller than that in the conventional technique in which a spacer is press-fitted into the gap between rollers.

A second aspect of the present invention provides the method for assembling a roller bearing according to the first aspect, wherein a surface of the spacer that faces the rolling contact surface of the roller has a concave shape for receiving the rolling contact surface of the roller. When the spacers are formed as above, the spacers are allowed to smoothly slide on the rolling contact surfaces of the rollers.

When the spacers are not formed to have the concave shape, or, in an extreme case, a cross-section of the spacer that is perpendicular to the axial direction of the bearing is flat from the upper part to the lower part, the spacers to be positioned on both sides of the last roller tend not to slide but to rotate at the respective original positions during the insertion of the last roller. Therefore, it is difficult to smoothly mount the last roller. The closer the radius of curvature or shape of the concave shape is set to the radius of curvature of the rolling contact surface of the roller, the smoother the sliding motion of the spacers becomes.

A third aspect of the present invention provides the method for assembling a roller bearing according to the first or second aspect, wherein, in a cross-section of the spacer that is perpendicular to an axial direction of the roller bearing, a wall thickness T of a forward portion in a sliding direction of the spacer falls within a range defined by the following inequality:

$$T \geq 3 \times \{Dpw \times (180/Z) - Dw\},$$

wherein Dpw is a diameter of a pitch circle of the rollers, Z is the number of the rollers, and Dw is a diameter of the roller. In this manner, the spacers are allowed to smoothly slide on the sliding contact surfaces of the rollers.

The above inequality implies that the spacers are allowed to more smoothly slide when the surface of the spacer that faces the rolling contact surface of the roller is formed to have the concave shape for receiving the rolling contact surface of the roller and, at the same time, a wall thickness of a predetermined size or larger is provided to the forward portion in the sliding direction of the spacer. The above inequality is an experimentally obtained inequality implying that each spacer is allowed to smoothly slide when the wall thickness T thereof is equal to or greater than three times the minimum gap between adjacent rollers.

A fourth aspect of the present invention provides the method for assembling a roller bearing according to any of the first to third aspects, wherein extended portions are provided at both axial ends of the spacer, the extended portion coming into contact with an end face of the roller. In this manner, the roller bearing can be assembled easily. Specifically, when the spacers to be placed on both sides of the last roller are placed along the front portions (the inner portions facing the inner side of the bearing) of the rolling contact surfaces of the rollers having been disposed, the extended portions of each spacer can be brought into engagement with the end faces of the rollers. In addition, the axial displacement of the spacers during the sliding motion can be prevented.

A fifth aspect of the present invention provides the method for assembling a roller bearing according to any of the first to fourth aspects, wherein a maximum length L of the extended portion falls within a range of $0.2\,Dw \leq L \leq 0.9\,Dw$, wherein Dw is the diameter of the roller. The reason that the lower limit is set to 0.2 Dw is that the extended portion is brought into contact with flat portion (excluding chamfered portions) of the end face of the roller. The reason that the upper limit is set to 0.9 Dw is to prevent the adjacent spacers from interfering with each other.

Effect of the Invention

According to the present invention, in the roller bearing having the spacers interposed between the rollers, the shape and the wall thickness of the spacers can be freely set within the range of the gap between adjacent rollers, so that the guiding surface of each spacer can have a sufficiently large area. In addition to this, the possibility that the spacers are cracked during assembling process can be reduced. Moreover, when the spacers are produced by injection molding of resin, the cost for the mold and molding process can be reduced.

Figure 1:
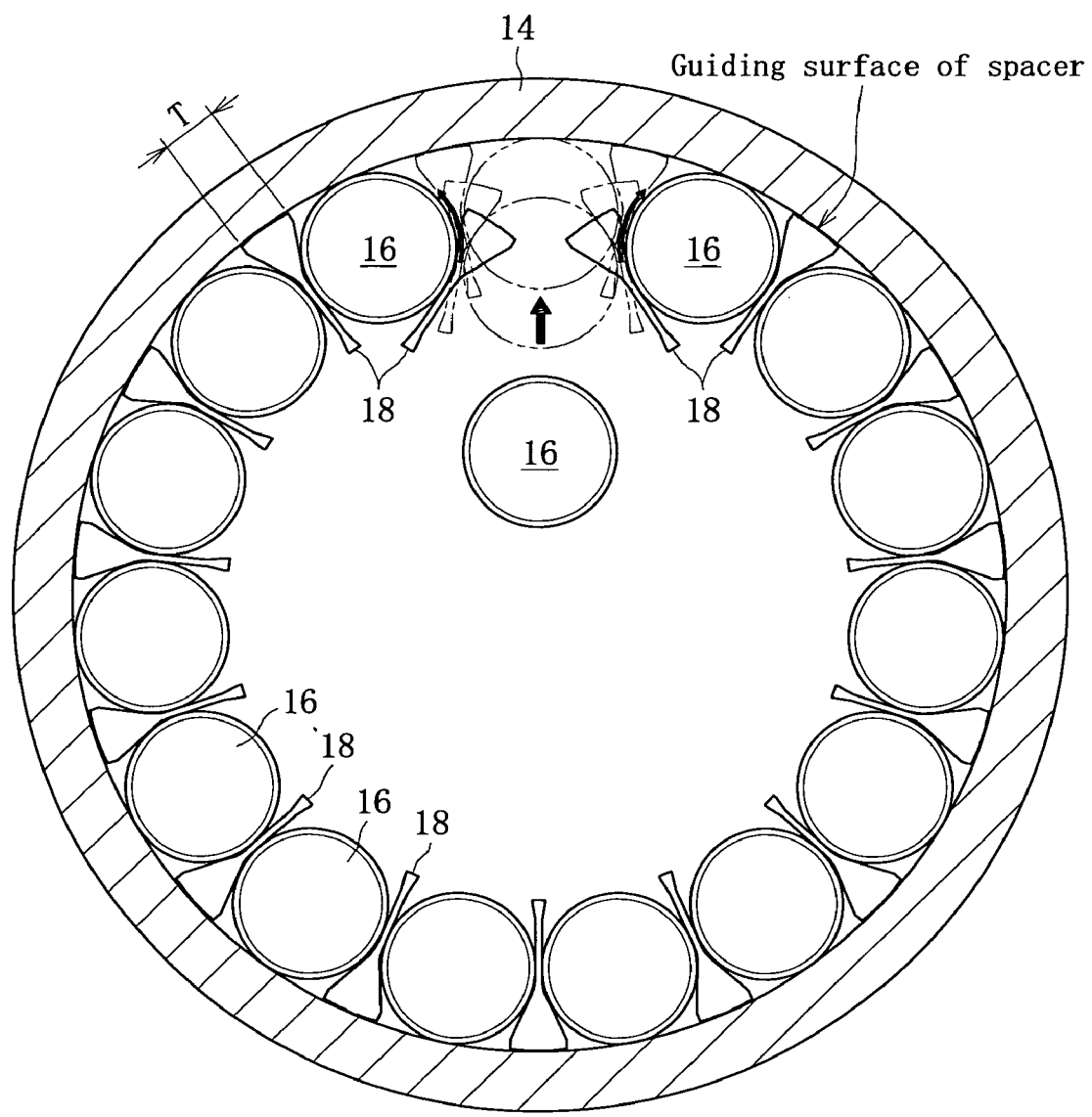
FIG. 1 is a plan view illustrating an embodiment of the present invention.

DESCRIPTION OF THE REFERENCE NUMERALS 12 inner ring
14 outer ring
16 roller
16a rolling contact surface
16b end face
18 spacer
18a extended portion
18b roller-contacting surface (surface that faces rolling contact surface of roller)

DETAILED DESCRIPTION OF THE INVENTION

Hereinafter, the preferred embodiments of the present invention will be described with reference to the drawings.

A description will now be given of an exemplary embodiment in which the present invention is applied to a cylindrical roller bearing shown in FIG. 1. FIG. 1 shows the process of assembling the cylindrical roller bearing. The assembling procedure is as follows: First, rollers 16 and spacers 18 are alternately disposed along the inner circumference of an outer ring 14. Then, the spacers 18 to be placed on both sides of the roller to be mounted last are placed along inner portions of the rolling contact surfaces 16a of the rollers 16 having been disposed, while the last roller 16 is inserted therebetween toward the outer ring 14 so that the spacers 18 placed on both sides are allowed to slide, whereby the last roller 16 is mounted on the inner circumference of the outer ring 14.

A surface, i.e., a roller-contacting surface 18b, of each spacer 18 which faces the rolling contact surface 16a of a roller 16 has a concave shape for receiving the rolling contact surface 16a. In the present embodiment, the roller-contacting surface 18b is configured to have two flat surfaces that form an obtuse angle in a transverse cross-section perpendicular to the lengthwise direction of the spacer 18 as shown in FIG. 1. The two flat surfaces face and come into contact with the rolling contact surface 16a which forms as an inscribing circle. As described above, since the surface of the spacer 18 which faces the rolling contact surface 16a is formed into a concave shape for receiving the rolling contact surface 16a, the spacer 18 is allowed to smoothly slide on the rolling contact surface 16a.

Figure 2:
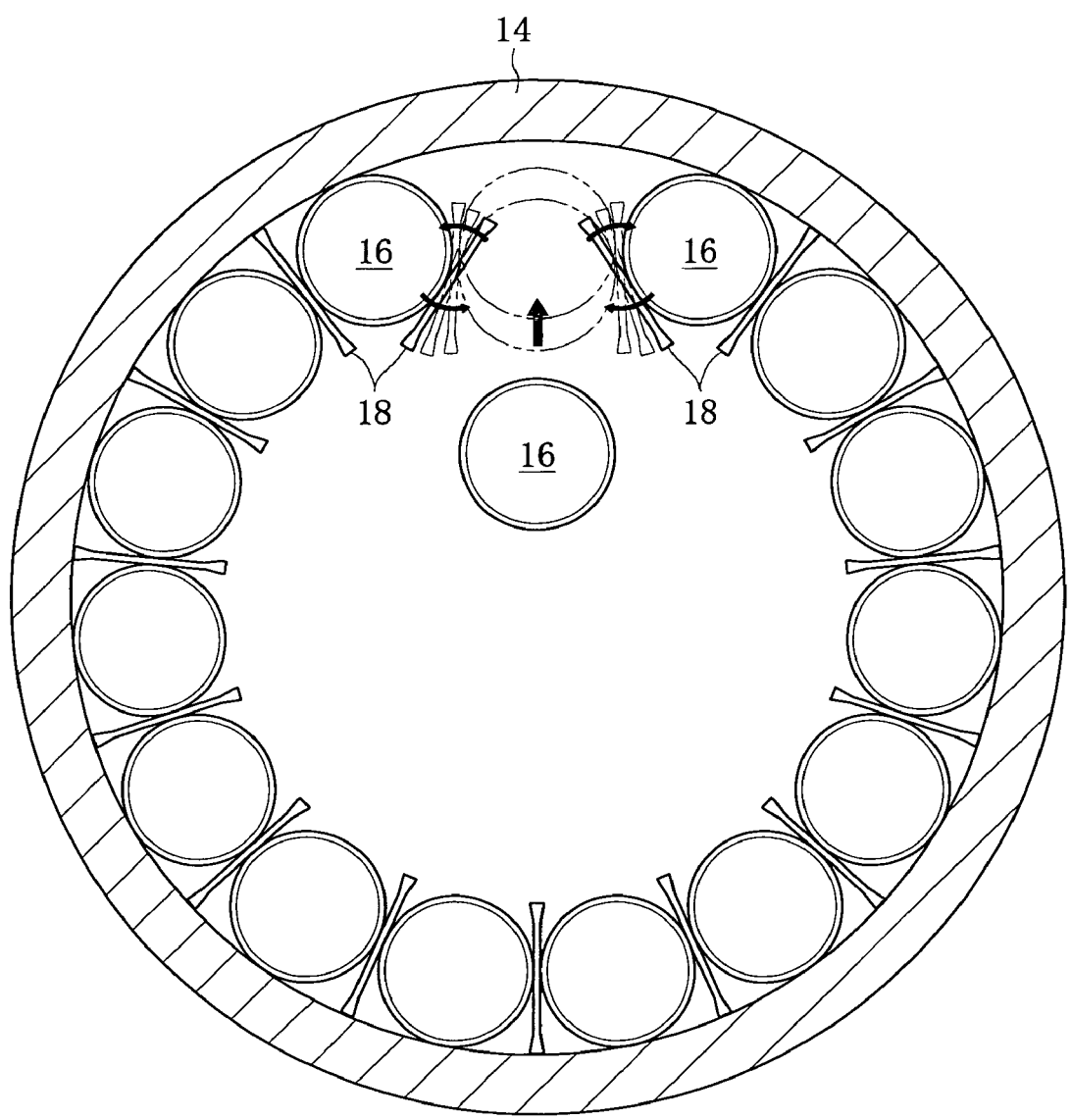
FIG. 2 is a plan view illustrating an explanatory comparative embodiment.

If the spacer 18 does not have a concave shape, or, in an extreme case, the surface of the spacer 18 that faces the rolling contact surface 16a has one single flat surface (see FIG. 2), the two spacers 18 placed on both sides of the last roller 16 tend not to slide but to rotate at the respective original positions during the insertion of the last roller 16. Therefore, it is difficult to smoothly mount the last roller 16. The closer the radius of curvature or shape of the concave shape is set to the radius of curvature of the rolling contact surface 16a, the smoother the sliding motion of the two spacers 18 becomes.

Moreover, the spacers 18 are allowed to smoothly slide on the rolling contact surfaces 16a when, in the transverse cross-section of the spacer 18, the wall thickness T of the forward portion in the sliding direction of the spacer 18 is set within the range defined by the following inequality:

$$T \geq 3 \times \{Dpw \times (180/Z) - Dw\},$$

wherein Dpw is the diameter of the pitch circle of the rollers, Z is the number of the rollers, and Dw is the diameter of the roller.

The above inequality implies that the spacer 18 is allowed to more smoothly slide when the surface of the spacer 18 that faces the rolling contact surface 16a is formed to have the concave shape for receiving the rolling contact surface 16a of the roller and, at the same time, a wall thickness of a predetermined size or larger is provided to the forward portion in the sliding direction of the spacer 18. The above inequality is an experimentally obtained inequality implying that the spacer 18 is allowed to smoothly slide when the wall thickness T thereof is equal to or greater than three times the minimum gap between adjacent rollers 16. For example, when the minimum gap between the adjacent rollers 16 is 1.8 mm, the wall thickness T of the forward portion in the sliding direction of the spacer 18 is set to 7 mm, which is approximately four times the minimum gap.

Figure 3:
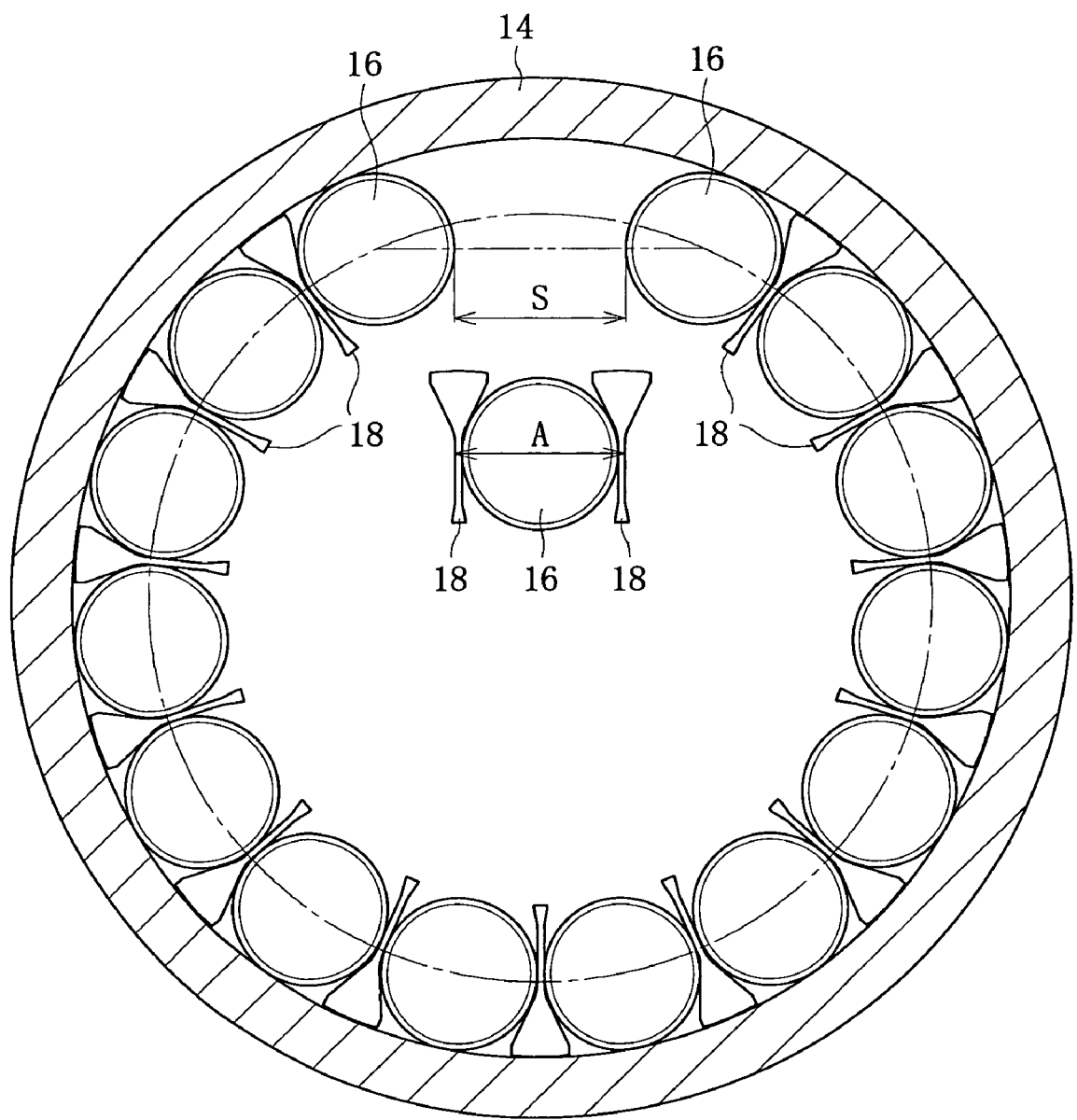
FIG. 3 is a plan view illustrating another embodiment.

FIG. 3 shows an exemplary embodiment in which the present invention is applied to a cylindrical roller bearing in which the keystone effect is exerted by the rollers 16 and the spacers 18. Specifically, as shown in the figure, in the state in which all the rollers 16 except one roller 16 and all the spacers 18 except two spacers 18 to be placed on both sides of the one roller 16 are disposed along the inner circumference of the outer ring 14, the length designated by symbol S and the length designated by symbol A satisfy the relationship of S<A. In this case, when the last roller 16 and the two spacers 18 pass through a portion having the length S, the two spacers 18 are required to be elastically deformed, but the same assembling procedure as in the above case can be used.

Figure 4:
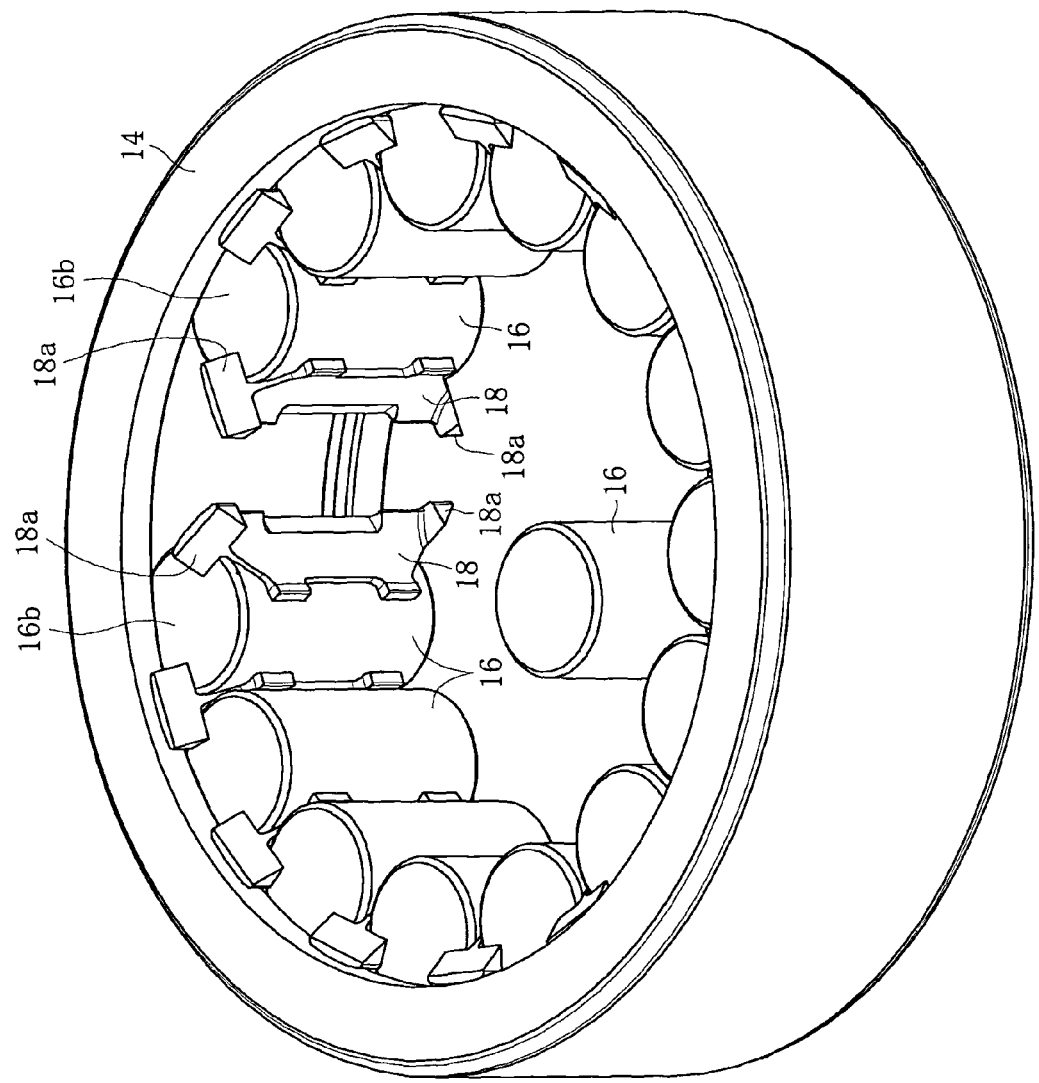
FIG. 4 is a perspective view illustrating still another embodiment.

In an embodiment shown in FIG. 4, extended portions 18a are provided at both axial ends of the spacer 18. Each extended portion has a surface that faces one end face 16b of the roller 16. In this case, the assembling procedure is the same as that in the above embodiments, but this configuration facilitates the assembly of the roller bearing. Specifically, when the last roller 16 is inserted by pressing it toward the outer ring 14, the two spacers 18 placed on both the sides of the last roller 16 slide without being displaced in the axial direction since the extended portions 18a are brought into engagement with the rollers 16. In this manner the workability is improved significantly. The advantage in that the axial displacement of the spacers 18 is prevented is maintained not only during the assembling process but also after completion of the assembly and during the operation of the bearing.

Figure 5:
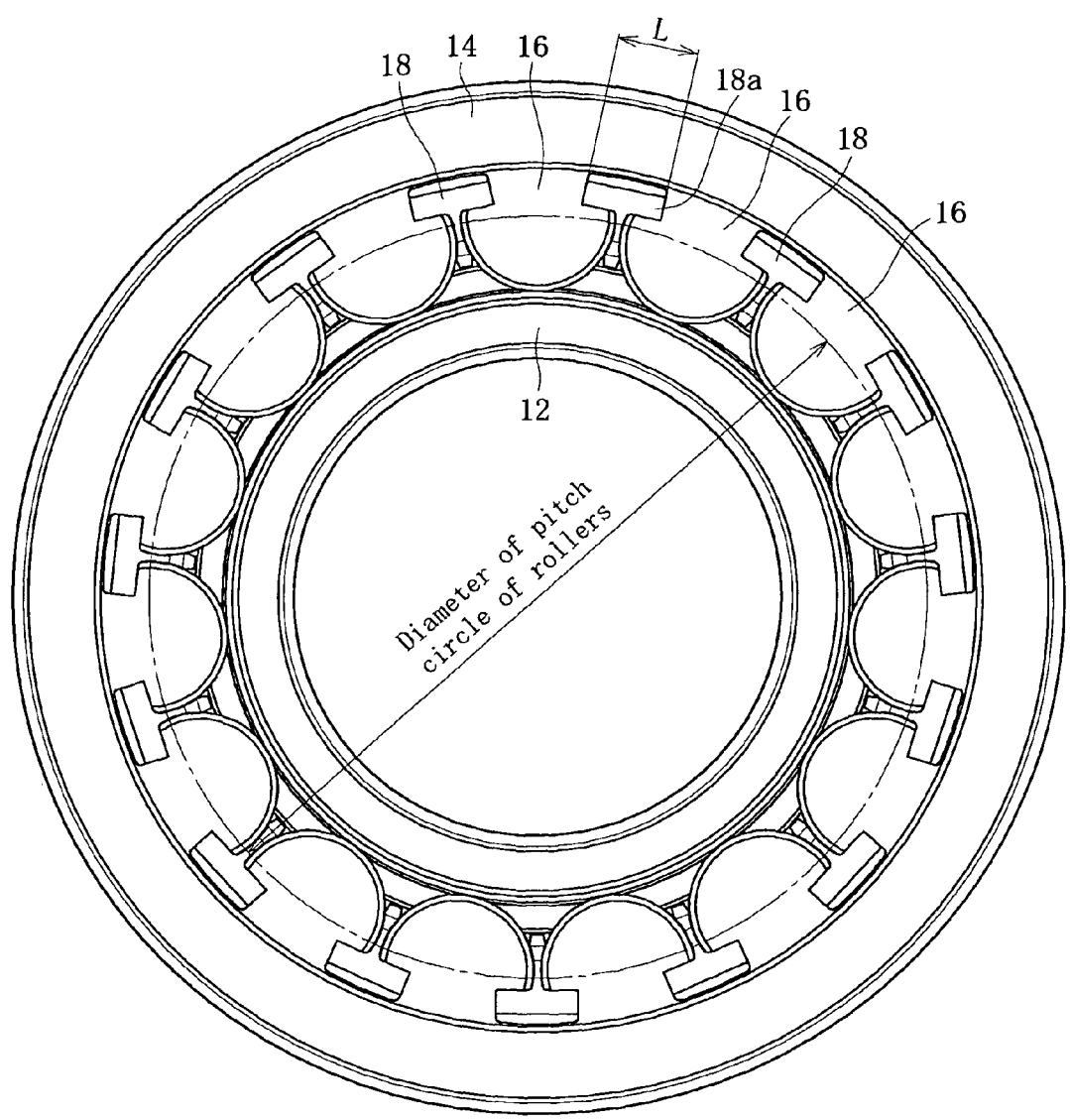
FIG. 5 is a plan view of the roller bearing shown in FIG. 4.
Figure 6:
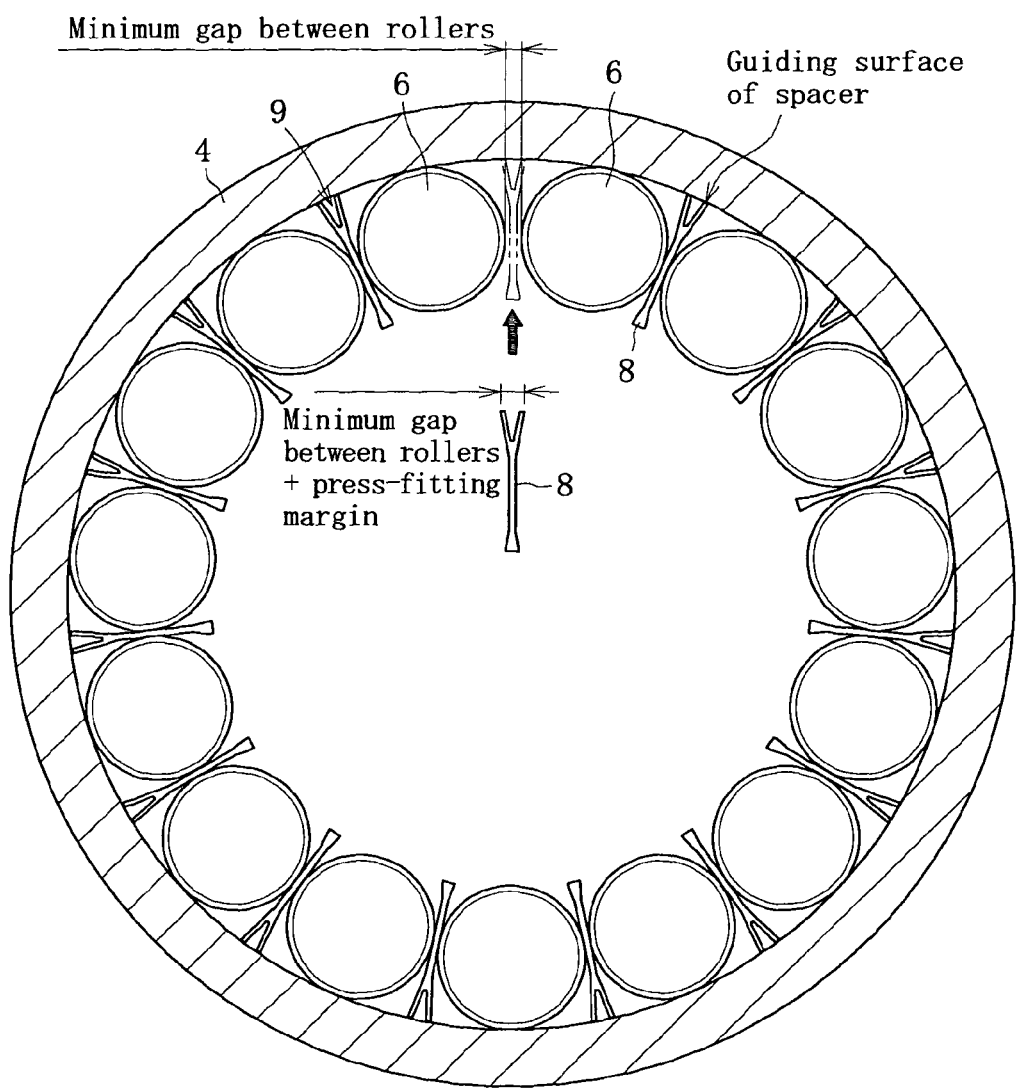
FIG. 6 is a plan view illustrating a conventional technology.

Preferably, as shown in FIG. 5, the maximum length L of the extended portion 18a falls within the range of $0.2 \text{ Dw} \leq L \leq 0.9 \text{ Dw}$, wherein Dw is the diameter of the roller. The reason that the lower limit is set to 0.2 Dw is that the extended portion 18a is brought into contact with the flat portion (excluding chamfered portions) of the end face 16b of the roller 16. The reason that the upper limit is set to 0.9 Dw is to prevent the extended portions 18a of adjacent spacers 18 from interfering with each other.

The invention claimed is:

1. A method for assembling a roller bearing including rollers and spacers interposed between adjacent rollers, the method comprising:
   providing rollers and spacers, each spacer having extended portions at both axial ends thereof;
   alternately disposing the rollers and the spacers along an inner circumference of an outer ring;
   mounting a last roller on the inner circumference of the outer ring by arranging two spacers along inner portions of rolling contact surfaces of respective adjacent rollers having been disposed such that the extended portions of the two spacers contact end faces of the respective adjacent rollers and the two spacers can freely revolve around the respective adjacent rollers; and
   inserting the last roller between the two arranged spacers toward the outer ring so that the two spacers are placed on both sides and are allowed to slide,
   wherein the extended portions of each spacer having been disposed contact end faces of the adjacent rollers,
   wherein the extended portions have a size which allows the two spacers to revolve around the last roller without interfering with each other as the last roller is inserted, and
   wherein the outer ring has a raceway surface and rim portions extending radially inwardly from the raceway surface, and each extended portion has a face which contacts one of the rim portions.

2. The method of claim 1, wherein surfaces of each spacer that face the rolling contact surface of the adjacent rollers have a concave shape for receiving the rolling contact surfaces of the adjacent rollers.

3. The method of claim 2, wherein each spacer has a forward portion disposed on an outer side of the spacer in a radial direction of the outer ring, and a wall thickness T of the forward portion of each spacer is equal to or greater than three times a minimum gap between adjacent rollers.

4. The method of claim 3, wherein a maximum length L of each extended portion falls within a range of $0.2 \text{ Dw} \leq L \leq 0.9 \text{ Dw}$, wherein Dw is the diameter of the roller.

5. The method of claim 1, wherein a maximum length L of each extended portion falls within a range of $0.2 \text{ Dw} \leq L \leq 0.9 \text{ Dw}$, wherein Dw is the diameter of the roller.

6. The method of claim 5, wherein each spacer has a forward portion disposed on an outer side of the spacer in a radial direction of the outer ring, and a wall thickness T of the forward portion of each spacer is equal to or greater than three times a minimum gap between adjacent rollers.

7. The method of claim 1, wherein each spacer has a forward portion disposed on an outer side of the spacer in a radial direction of the outer ring, and a wall thickness T of the forward portion of each spacer is equal to or greater than three times a minimum gap between adjacent rollers.

* * * * *